INVENTOR:
EDMUND I. SCHWARTZ

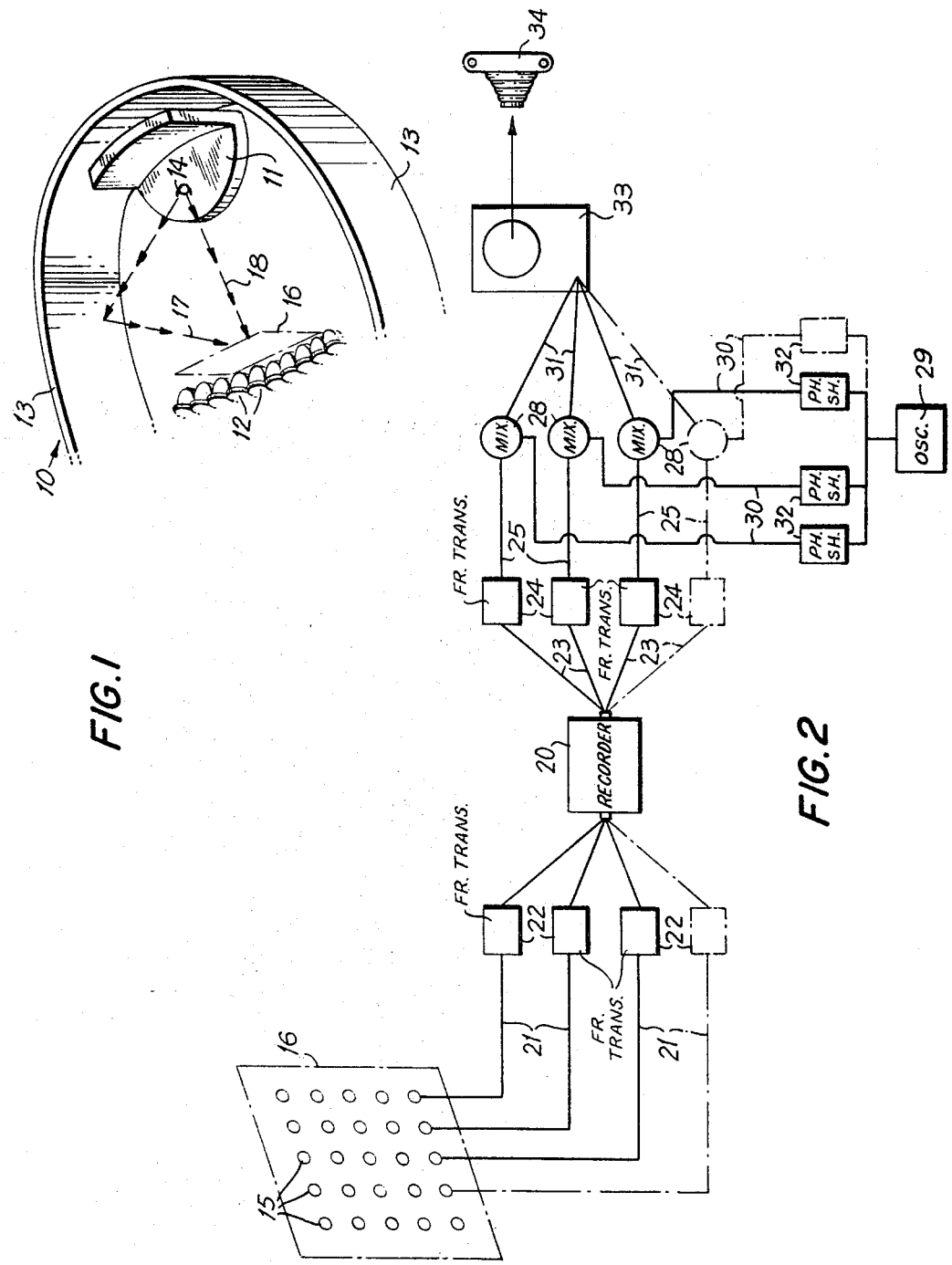

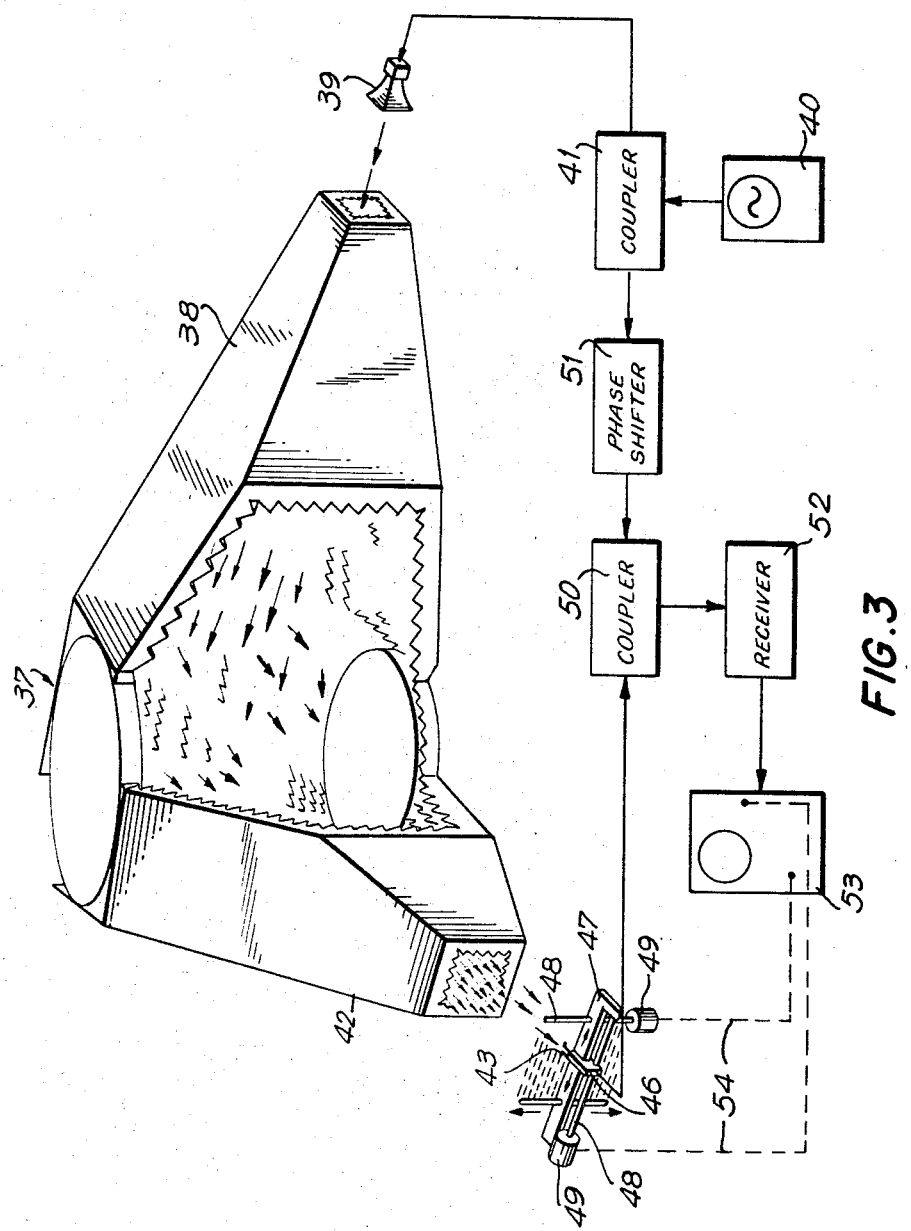

BY Breitenfeld & Levine
ATTORNEYS

United States Patent Office 3,410,363
Patented Nov. 12, 1968

3,410,363
METHOD AND APPARATUS FOR TESTING THE WAVE-REFLECTING CHARACTERISTICS OF A CHAMBER
Edmund I. Schwartz, Fairlawn, N.J., assignor to Devenco Incorporated, a corporation of New York
Filed Aug. 22, 1966, Ser. No. 574,243
9 Claims. (Cl. 181—.5)

ABSTRACT OF THE DISCLOSURE

Coherent energy wave directed into chamber, and reflections from surfaces within chamber sensed at a plurality of points in a sensing plane. Sensed signals transmitted to a receiver and reference signal having phase coherency with energy wave added to sensed signals, to produce interference signals. Interference signals recorded on optical recording medium to produce a recording similar to a hologram, and recording illuminated by coherent visible light. Chamber may be an auditorium and energy wave may be sound waves; chamber may be anechoic chamber and energy wave may be microwaves.

---

This invention relates to the testing of the wave-reflecting characteristics of a chamber, such as a concert hall or an anechoic chamber. More particularly, the invention relates to a method and apparatus for producing a three-dimensional visual presentation of the wave-reflecting characteristics of such a chamber.

In the case of a concert hall, or auditorium of any kind, the manner in which acoustic waves are reflected from the walls, ceiling, floor, and other surfaces within the hall (this characteristic being commonly referred to as the "acoustics" of the auditorium) is of great interest. The testing of large auditoriums, by means of existing equipment and techniques, to determine their acoustical qualities is a very time consuming and expensive procedure. Furthermore, the results achieved by present test methods are usually less than satisfactory.

In connection with anechoic chambers used to test microwave targets placed within such a chamber, it is important that reflections of microwave energy from the walls of the chamber to the receiving antenna be made a minimum or at best entirely eliminated. At present, a complex procedure involving part experiment and part calculation is employed to determine at what points the walls of the chamber act as reflecting surfaces.

It is an object of the present invention to provide a relatively simple and yet highly accurate method for determining the wave-reflecting points within a chamber.

It is another object of the invention to provide a method and apparatus for rendering a three-dimensional visual representation of the reflection points within a chamber.

It is an additional object of the invention to provide a method and apparatus for rendering such a visual representation which also indicates the relative intensity of the energy reflected from the reflection points within the chamber.

It is a further object of the invention to provide a method and apparatus capable of producing a hologram bearing a three-dimensional visual indication of the points of reflection within a concert hall from which a listener receives acoustic waves, the points of reflection within an anechoic chamber from which an antenna receives microwaves, or the points of reflection in any other type of chamber.

Optical holograms are, of course, well known. Such a hologram is a photographic record, such as a photographic transparency, of "wave-fronts" of visible light reflected from a subject bathed in the light. The hologram contains no recognizable image, since no lens or other focusing mechanism is used to make the hologram. Instead, to the naked eye, a hologram appears as a hapazard arrangement of specks and dots bearing no resemblance to the subject from which the light was reflected.

According to one known method of producing optical holograms, the subject to be "photographed" is illuminated by means of a coherent visible light source such as a laser. A wave pattern of light reflected from the subject exhibits both amplitude and phase variations. However, since photographic film is capable of recording only intensity variations, some technique must be employed to convert the phase variations to amplitude variations which can be recorded. This is accomplished by using a reference beam of coherent visible light, derived from the same source as the illuminating light beam in such a way as to insure that the two beams will constructively and destructively interfere with each other. The reference beam is directed at the photographic film located in the "hologram plane." The reflected light and the reference beam interfere with each other to produce an interference pattern on the film. This pattern constitutes intensity variations which correspond to the phase and amplitude variations in the reflected light wave. For a reason which will be pointed out below, the reference beam is directed against the film at an angle to the path along which the reflected waves move toward the film.

When a hologram transparency, which has been developed from the exposed film, is illuminated with coherent visible light, a number of diffraction patterns or wavefronts are propagated, one of which converges to form a real image of the subject and another of which appears to emanate from a virtual image of the subject. The virtual image can be viewed directly by the eye. This "reconstructed" image is not comparable to the two-dimensional image found on a conventional photographic transparency. Rather, it looks very similar to the original three-dimensional subject. When viewing the reconstructed image, parallax (the apparent displacement of an object when seen from different directions) between near and far portions of the subject can be seen. Consequently, upon relative movement between the hologram and the observer, portions of the subject which may have been blocked by others can be seen. In addition, the observer must refocus his eyes to view near portions of the subject after viewing far portions. As a result of the angle between the reference beam and the path of reflected waves impinging upon the film, the real and virtual images can be made completely separate and hence do not in any way distort each other.

According to the present invention, instead of employing visible light, as is used to produce optical holograms, coherent energy waves of the type whose reflections are of concern are directed into the chamber. Thus, in the case of a concert hall, sonic waves from a coherent source, which may be located on the stage, are directed into the hall. In the case of an anechoic chamber, coherent microwave energy is directed into the chamber. A sensing device, such as a microphone, is located at an appropriate position; e.g. within the audience seating area, and scanned across a single sensing plane. The sensing plane is comparable to the hologram plane of an optical system.

From this point on, production of a hologram depicting the wave-reflecting characteristics of the chamber, and viewing the hologram, may be accomplished in the manner set forth in copending application Ser. No. 533,522, filed Mar. 10, 1966. Briefly stated, this includes transmitting the sensed signals, which include amplitude and phase variations caused by the reflections of the original coherent wave, to a receiver. The signals, after appropriate adjustment to be described below, are then recorded. The record may be an optical one which can be viewed by means of a source of coherent visible light, in the same way that usual optical holograms are viewed, in order to see the subject which has been illuminated by energy invisible to the eye. Alternatively, the record may be a non-optical one which can at some later time be converted to an optical record.

Since recording media in general are not sensitive to phase variations, an adjustment must be made in the sensed signals, comparable to the employment of a reference beam in optical systems, if the phase variations in the reflected energy waves are to be recorded. By adding a reference signal to the sensed signals after they leave the sensing plane, resultant information-bearing interference signals can be produced at the receiver. Furthermore, as mentioned above, it is desirable in optical systems to direct the reference beam at an angle to the reflected waves to separate the real and virtual images produced by the hologram. An angle between the sensed and reference signals can be simulated by introducing an appropriate phase shift into the reference signal, the amount of the phase shift varying with the displacement of the sensing point or sensing device across the sensing plane.

A hologram made according to the present invention, when viewed with coherent visible light, shows a three-dimensional group of light and dark spots, the light spots indicating the points on the surfaces within the chamber which have reflected energy waves to the sensing device. The size and intensity of each bright spot gives an indication of the intensity of the energy reflected from its corresponding point in the chamber in relation to the intensity of the energy received from the other reflecting points. One way of using the hologram is to superimpose it upon a three-dimensional photograph of the chamber to visually indicate the reflecting points in the chamber.

The invention will now be described in more detail with reference to the accompanying drawings.

In the drawings:

FIG. 1 is a diagrammatic perspective view of a concert hall being tested according to this invention;

FIG. 2 is a schematic diagram of an arrangement for producing a hologram of the wave-reflecting characteristics of the concert hall;

FIG. 3 is a schematic diagram of an arrangement for producing a hologram of the wave-reflecting characteristics of a bistatic anechoic chamber.

Figure 4:
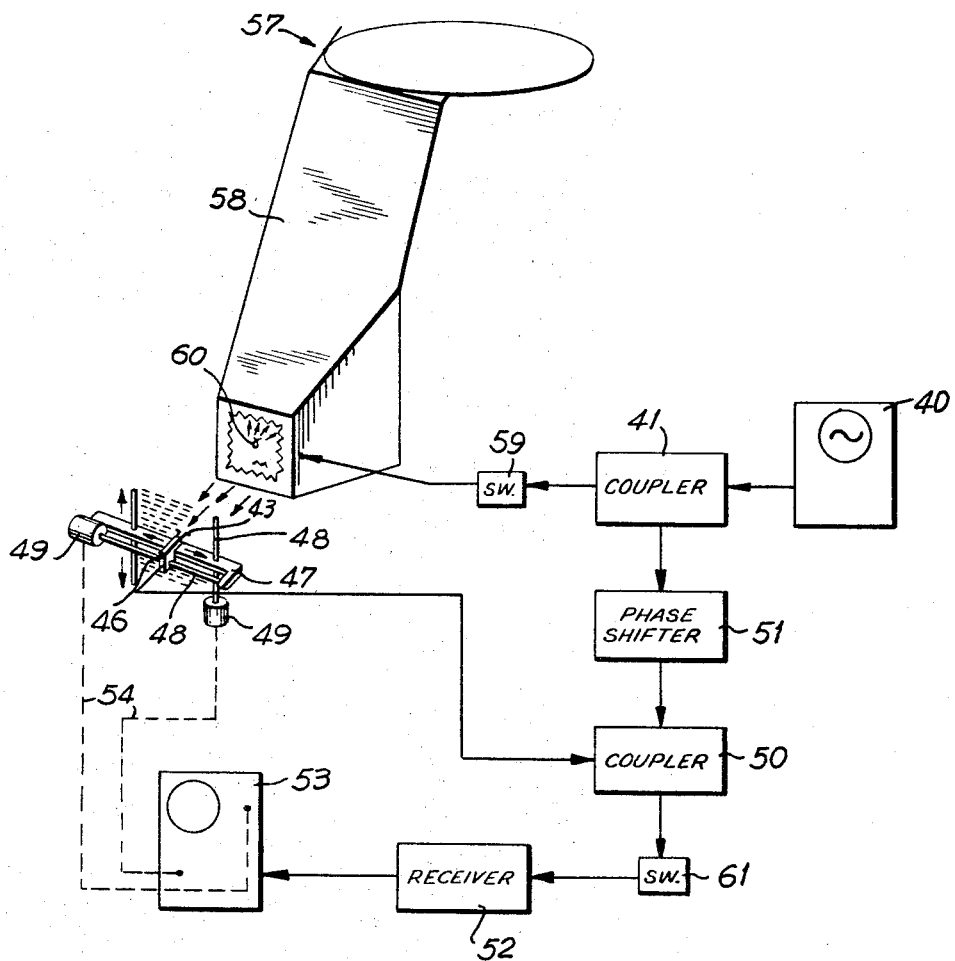
FIG. 4 is a schematic diagram of an arrangement for producing a hologram of the wave-reflecting characteristics of a monostatic anechoic chamber.

One arrangement chosen to illustrate the present invention is shown in FIGS. 1 and 2. FIG. 1 depicts a concert hall or like auditorium 10, having a stage 11, audience seats 12, and walls 13. To test the acoustic-wave-reflecting characteristics of the auditorium 10, a source 14 of coherent sound waves is placed on the stage where, of course, the performers usually are located. In addition, a series of sensing devices such as microphones 15 (FIG. 2) mounted on a suitable framework, indicated by the dot-dash lines 16, is located among the seats 12 so as to receive the sound waves from source 14 just as they would be received by listeners in the seats in the vicinity of the framework 16. The microphones are all arranged in a single sensing plane corresponding to the hologram plane in optical holography.

Listeners in a concert hall hear undisturbed sound waves directly from the stage, as indicated by the arrows 18, and also hear sound waves reflected from surfaces enclosing the concert hall, such as the walls 13. An example of the latter waves is indicated by the arrows 17. The reflected sound waves 17 and the direct waves 16 affect each other to an extent depending primarily upon their relative phase. Thus if they are out of phase they tend to detract from each other, and if they are in phase they reinforce each other. Sound waves reflected from different points affect each other in the same way. Thus, in any particular seat 12, the reflected and directly-received waves may have phase relationships which cause them to detract from one another in such a way as to make the resultant sound unsatisfactory. If the points of the auditorium from which sound waves are reflected to this seat are known, it is possible to make physical alterations at these points to alter their reflecting characteristics and improve the resultant sound at that seat.

A hologram displaying, in three dimensions, the points which reflect sound waves to the microphones 15 may be produced by means of the arrangement shown in FIG. 2. It is to be understood that this is only one example of the many ways in which sound waves sensed by the microphones 15 can be converted into a visible hologram. For example, the arrangement shown in FIG. 1 of the aforementioned copending application could be employed.

FIG. 2 is not intended to illustrate the exact number of microphones which are employed in practice. In fact, a much larger number of microphones will ordinarily be employed, the number being sufficient to render enough signals to produce a useful hologram. Furthermore, in order to insure that adequate information is sensed by the array of microphones 15 to enable reproduction of the wave front reaching the sensing plane containing the microphones, the horizontal and vertical spacing between adjacent microphones should be a fraction of the "carrier wavelength" as defined in the aforementioned copending application.

The sound waves sensed by each microphone 15 are transmitted toward a video tape recorder 20 via separate conductors 21. Each microphone has its own conductor, but only one recorder 20 need be employed. In order to permit the signals from all the microphones to be recorded simultaneously, advantage is taken of the fact that video tape has a frequency range of from zero to about four megacycles per second (i.e. four million cycles per second). On the other hand, the signals from each microphone 15 usually do not exceed a range of about 3000 cycles per second, but the range could be somewhat greater. Consequently, a filter and frequency translator 22 is interposed, in each conductor 21, between its respective microphone 15 and the video recorder 20. Each filter and frequency translator serves to shift the signals from its respective microphone into a 3000 cycle band width (determined by the filter) different from the band occupied by the signals from all of the other microphones.

After the signals from the microphones 15 are recorded on video tape and the recorder 20, the tape can be played back, through apparatus of the type described below, to reproduce the signals, at any desired time thereafter and, if desired, at a location remote from the concert hall 10. In the alternative, the tape can be played back immediately, or the recorder can even be dispensed with and the signals from the microphones transmitted directly to the remainder of the apparatus shown in FIG. 2 and about to be described.

The reproduced signals are transmitted via conductor 23 to a bank of filters and frequency translators 24. Each filter and frequency translator is designed to pass only a single 3000 cycle band associated with one of the microphones 15, each filter of course passing signals within a different one of the bands. Thus, the signals leaving each filter and frequency translator 24 along conductors 25 correspond to the acoustic signals received by its respective microphone 15. After each signal leaves its filter and frequency translator 24, a reference signal is added to it at a mixer 28, the reference signal being produced by an oscillator 29 and transmitted to each mixer by a separate conductor 30. The reference signal should have a frequency identical to the frequency of the sound wave being used to test the chamber 10, i.e., the frequencies of the signals emanating from the source 14 and the oscillator 29 should be identical. The reference signal may be recorded on a separate track of the tape at the same time the signals from microphones 15 are recorded. Addition of the reference signal to the signal from each filter 24 results in the production of interference signals leaving the mixers 28 via conductors 31.

In order to simulate an interference pattern analogous to the pattern produced by directing the reference beam of an optical hologram system at an angle to the light waves reflected from the subject, a phase shift is introduced into the reference signal between the oscillator 29 and each mixer 28. This is accomplished by means of a suitable variable phase shifter 32 arranged in each conductor 30. The phase shift could, if desired, be introduced into the signals from the filters 24 by arranging phase shifters in the conductors 25. It will be appreciated that if a reference beam having a sinusoidal wave form were actually directed at the sensing plane containing the microphones 15, at an angle to the plane, the phase of the reference beam as it strikes different levels of the sensing plane would vary. For example, if a positive peak of the reference wave form strikes the top of the sensing plane, obviously a negative peak of the wave will strike some point below the top.. Thus, the phase shifters 32, employed with reference signals which are mixed with signals from, say,, the uppermost horizontal row of microphones, are given some arbitrary setting. The phase shifters associated with the signals from the next horizontal row of microphones are adjusted to shift the phase of their respective reference signals an amount corresponding to the phase shift in a reference beam, directed at some assumed angle to the sensing plane, which would appear to a viewer moving down the sensing plane.

To convert the interference signals to a visible form, the signals in conductors 31 are applied as Z-axis modulation to an oscilloscope 33. Although an oscilloscope is employed in the present example, other transducers for converting the niterference signals to visible light signals may be employed. It is most convenient to apply the interference signals to the oscilloscope individually, not simultaneously, and then scan the oscilloscope in such a way that the visible signal will appear on the oscilloscope screen in a location corresponding to the location in the sensing plane of the microphone corresponding to the interference signal being applied to the oscilloscope. Applying the interference signal to the oscilloscope individually can be accomplished by playing back the video tape a number of microphones 15, and employing a suitable switching arrangement (not shown) for connecting each of the mixers 28 to the oscilloscope 33 in sequence.

An optically viewable record of the interference signals can be made by photographing the interference pattern which appears on the oscilloscope screen by means of a camera 34. The camera lens employed to form the optical record, which may be a photographic transparency, produces a record or transparency preferably of such size that the ratio between the size of the transparency and the wavelength of the visible light, which will be used to illuminate the transparency, equals the ratio between the size of the sensing plane and the wavelength of the sound wave emanating from source 14. The manner of viewing the transparency, which corresponds to an optical hologram, may be the same as that described in the aforementioned copending application.

FIG. 3 shows an illustrative arrangement for testing a bistatic anechoic chamber 37. Coherent microwave energy is transmitted into the chamber, through one of its horns 38, by a transmitting antenna 39. The energy is transmitted to the antenna 39 from a coherent microwave source 40 via a directional coupler 41 which serves to split the signal from the source 40 between the antenna 39 and the remainder of the apparatus which will be described below.

Ideally, none of the microwave energy is reflected out of the chamber 37 through its other horn 42. However, in practice, some energy is reflected through the horn 42, and a microwave receiving antenna 43 is positioned to receive this reflected energy. The antenna 43 is arranged to be scanned across a sensing plane. This may be achieved by mounting the antenna 43 on a carrier 46 adapted to be shifted horizontally along a track 47, the track being in turn shiftable vertically. Movement of the carrier 46 and track 47 may be accomplished by means of rotatable worms 48 driven by motors 49. Thus, it will be appreciated that the antenna 43 may be advanced from point to point into a series of successive horizontally aligned positions in the sensing plane. After the antenna completes its horizontal travel across the sensing plane, it can be moved vertically an increment equal to the spacing between the horizontally aligned sensing positions and then scanned horizontally again. This continues until the entire sensing plane has been scanned. Although one type of scanning pattern has been described above, it is to be understood that many other types of scanning patterns may be employed.

The reflected signals received by antenna 43 are transmitted to a directional coupler 50; which serves as a summing device. Also transmitted to the coupler 50, via a variable phase shifter 51, is the portion of the energy from source 40 not transmitted to antenna 39. The energy transmitted from coupler 41 to coupler 50 represents a reference signal which when added to the reflected signals reaching the coupler 50 from antenna 43 produces interference signals at the output side of the coupler 50. The phase shifter 51 serves to shift the phase of the reference signal according to some predetermined scheme to simulate, in the interference signals, directing the reference beam of an optical hologram system at some selected angle to the light waves reflected from the subject. The interference signals may be amplified and detected by a receiver 52, and then applied as Z-axis modulation to an oscilloscope 53. Scanning of the oscilloscope may be controled by the mechanism which serves to scan the antenna 43, as indicated by the broken lines 54, to cause the visible signal to appear on the oscilloscope screen in a location corresponding to the location of the antenna 43 in the sensing plane when the reflected signal represented by the visible signal was sensed by the antenna.

By photographing the oscilloscope screen, a hologram transparency will be produced which when viewed by a source of coherent visible light will indicate, by bright spots, the points in the chamber 37 which reflected microwave energy to the antenna 43.

FIG. 4 illustrates the testing of a monostatic anechoic chamber 57 according to this invention. Most of the components of the arrangement shown are the same as those illustrated in FIG. 3 and these components have been given the same reference numerals as the corresponding components of FIG. 3. Since the transmitted wave and the reflected wave enter and leave the chamber 57 through its single horn 58, a switch 59 is interposed between the directional coupler 41 and the transmitting antenna 60. The switch 59 alternates constantly between an open and a closed condition thereby causing the transmitted wave to be directed into the chamber intermittently or in pulses. A second switch 61 between the directional coupler 50 and detector 52 is always in a condition opposite to the condition of switch 59. Thus, when the switch 59 is closed, the switch 61 is open to prevent overload or burn out of the receiver 52 resulting from the direct pick up by the antenna 43 of power transmitted by antenna 60. On the other hand, when the switch 59 is open, the switch 61 is closed so that the receiver 52 receives reflected signals from the antenna 60. It should be noted that although the microwave energy is transmitted into the chamber in pulses, the source 40 is not turned off, hence coherence of the energy is not lost.

The invention has been shown and described in preferred form only, and by way of example, and many variations may be made in the invention which will still be comprised within its spirit. It is understood, there-

What is claimed is:

1. A method of producing a visual presentation of the wave-reflecting characteristics of a chamber, comprising the steps of:
   (a) directing a coherent energy wave into the chamber,
   (b) sensing at a plurality of points in a sensing plane the amplitude and phase of the reflections of said energy wave from surfaces within the chamber including the walls of the chamber,
   (c) transmitting the reflected energy signals from the sensing plane to a receiver,
   (d) adding a reference signal to said reflected energy signals to produce resultant interference signals, the reference signal having phase coherency with said coherent energy wave of step (a),
   (e) recording the interference signals on an optical recording medium so that it will modulate coherent visible light, each point on the optical recording corresponding to a point in the sensing plane, and
   (f) illuminating the optical recording by means of a source of coherent visible light.

2. A method as defined in claim 1 wherein said reference signal is added to said reflected energy signals after the latter leave the sensing plane, and including the step of introducing a phase shift into one of the signals which produce the interference signals, the amount of phase shift varying with the displacement of the sensing point across the sensing plane.

3. A method as defined in claim 1 wherein the reference signal of step (d) is obtained from the source which supplies the energy wave of step (a).

4. A method as defined in claim 1 wherein said energy wave of step (a) is an audio wave, and the reflected audio waves are sensed in the sensing plane by microphone means.

5. A method as defined in claim 1 wherein said chamber is an anechoic chamber, said energy wave of step (a) is microwave energy, and the reflected microwave energy is sensed in the sensing plane by microwave antenna means.

6. A method of recording the wave-reflecting characteristics of a chamber, comprising the steps of:
   (a) directing a coherent energy wave into the chamber,
   (b) sensing at a plurality of points in a sensing plane the amplitude and phase of the reflections of said energy wave from surfaces within the chamber including the walls of the chamber,
   (c) transmitting the reflected energy signals from the sensing plane to a receiver, and
   (d) recording the reflected signals in a way to permit further processing of the individual reflected signals.

7. A method as defined in claim 6 including the steps of:
   (e) reproducing the recording reflected signals,
   (f) adding a reference signal, having phase coherency with said coherent energy wave of step (a), to said signals of step (e) to produce interference signals,
   (g) introducing a phase shift into one of the signals which produce said interference signals, the amount of the phase shift varying with the displacement of the sensing point across the sensing plane,
   (h) converting the interference signals to visible form, and
   (i) recording the signals of step (h) on an optical recording medium, each point on the optical recording corresponding to a point in the sensing plane.

8. Apparatus for producing a visual presentation of the wave-reflecting characteristics of a bistatic anechoic chamber, comprising:
   (a) a source of coherent energy waves arranged to direct said energy waves into one horn of the chamber,
   (b) sensing means arranged to receive at a plurality of points in a sensing plane energy waves reflected through the other horn of the chamber by surfaces within the chamber,
   (c) a transducer capable of converting signals such as said sensed signals to visible light signals,
   (d) means for transmitting the sensed signals from said sensing means to said transducer,
   (e) means for scanning said transducer in a manner corresponding to the displacement of the sensing point across the sensing plane,
   (f) means for adding a reference signal to said sensed signals before they reach said transducer to produce interference signals,
   (g) phase shift means for shifting the phase of one of the signals which produces each interference signal an amount dependent upon the displacement of the sensing point across the sensing plane, and
   (h) means for recording the transducer display on a medium capable of modulating visible light.

9. Apparatus for producing a visual presentation of the wave-reflecting characteristics of a monostatic anechoic chamber, comprising:
   (a) a source of coherent energy waves arranged to direct pulses of said energy into the horn of the chamber,
   (b) sensing means arranged to receive at a plurality of points in a sensing plane energy waves reflected back through the horn by surfaces within the chamber,
   (c) a transducer capable of converting signals such as said sensed signals to visible light signals,
   (d) means for transmitting the sensed signals from said sensing means to said transducer only during the periods between the pulses of energy from said source,
   (e) means for scanning said transducer in a manner corresponding to the displacement of the sensing point across the sensing plane,
   (f) means for adding a refernce signal to said sensed signals before they reach said transducer to produce interference signals,
   (g) phase shift means for shifting the phase of one of the signals which produces each interference signal an amount dependent upon the displacement of the sensing point across the sensing plane, and
   (h) means for recording the transducer display on a medium capable of modulating visible light.

References Cited

UNITED STATES PATENTS

| 3,111,186 | 11/1963 | Schroeder | 181—.5 |
| 3,156,316 | 11/1964 | Barney et al. | 181—.5 |
| 3,270,833 | 9/1966 | Schroeder | 181—.5 |
| 3,284,799 | 11/1966 | Ross | 343—17 X |
| 3,343,627 | 9/1967 | Schroeder | 181—.5 |

OTHER REFERENCES

Greguss: Techniques and Information Content of Sonoholograms, The Journal of Photographic Science (British), vol. 14, 1966, pp. 329–332.

BENJAMIN A. BORCHELT, *Primary Examiner.*

G. H. GLANZMAN, *Assistant Examiner.*